United States Patent
Ryoo et al.

[11] Patent Number: 5,719,869
[45] Date of Patent: Feb. 17, 1998

[54] NONSYNCHRONOUS COMMUNICATION CONTROLLER FOR AV SYSTEM

[75] Inventors: Kgi Wung Ryoo; Jeong Yeol Kim, both of Kyungki-do, Rep. of Korea

[73] Assignee: LG Electronics Inc., Seoul, Rep. of Korea

[21] Appl. No.: 568,278

[22] Filed: Dec. 6, 1995

[30] Foreign Application Priority Data

Dec. 14, 1994 [KR] Rep. of Korea ............... 34232/1994
Aug. 4, 1995 [KR] Rep. of Korea ............... 24157/1994

[51] Int. Cl.$^6$ ............................................. H04J 3/02
[52] U.S. Cl. ................................................. 370/445
[58] Field of Search ........................ 370/85.1, 85.2, 370/85.3, 445, 252, 431, 503, 508; 340/825.24, 825.25; 348/13, 14, 16; 455/7, 9; 375/354, 371

[56] References Cited

U.S. PATENT DOCUMENTS

| | | | |
|---|---|---|---|
| 4,481,626 | 11/1984 | Boggs et al. | 370/85.3 |
| 5,311,172 | 5/1994 | Sadamori | 340/825.5 |
| 5,383,185 | 1/1995 | Armbruster et al. | 370/85.3 |
| 5,510,975 | 4/1996 | Ziegler, Jr. | 364/148 |
| 5,519,457 | 5/1996 | Nishigaki et al. | 348/734 |
| 5,532,684 | 7/1996 | Katsu | 340/825.25 |

*Primary Examiner*—Hassan Kizou
*Assistant Examiner*—Kwang Bin Yao
*Attorney, Agent, or Firm*—John P. White

[57] ABSTRACT

A nonsynchronous communication controller for an AV system is disclosed including a first collision detector for detecting a first collision signal and a noise of an impulse component; a noise removing portion for detecting the first collision signal without noise; a ½ window signal generator for producing a ½ Tm window signal; a delay compensator for compensating for time base delay; a first collision compensator for comparing and mixing a compensation signal of the delay compensator and the ½ Tm window signal of the ½ window signal generator; a second collision detector for comparing and mixing the first compensated signal of the first collision compensator and the ½ Tm window signal of the ½ window signal generator; a window signal generator for changing the second collision signal of the second collision detector to a window signal, and interrupting data transmission to a microcomputer; a transmission determining portion for comparing and mixing the window signal of the window signal generator and the main apparatus' control signal to produce transmission or no signal; and a transmission/reception portion for receiving other apparatus' control signal or the main apparatus' control signal, and transmitting the control signal to the microcomputer and to the first collision detector.

5 Claims, 8 Drawing Sheets

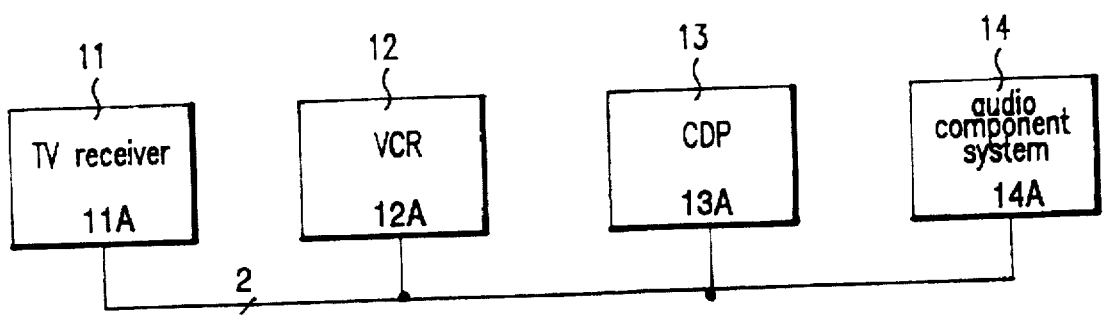
F I G.3

FIG.8A
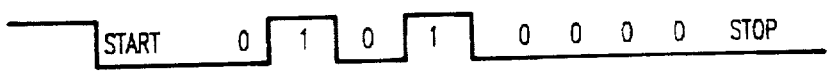
FIG.8B
FIG.8C
FIG.8D
FIG.8E
FIG.8F
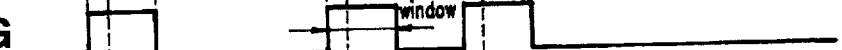
FIG.8G
FIG.8H
FIG.8I
FIG.8J

FIG.9A
FIG.9B
FIG.9C
FIG.9D
FIG.9E
FIG.9F
FIG.9G
FIG.9H
FIG.9I
FIG.9J
FIG.9K

NONSYNCHRONOUS COMMUNICATION CONTROLLER FOR AV SYSTEM

BACKGROUND OF THE INVENTION

The present invention relates to a communication controller, and more particularly, to a nonsynchronous communication controller for an AV system in which a common serial communication method is used to an AV system or home automation (HA) system to which a plurality of apparatuses are coupled to each of which an equal priority is given to prevent one of the apparatuses from dominating the communication line, and to detect the operation commands or states of the respective apparatuses in accordance with their prior occupation so that desired data is transmitted to a desired apparatus.

Generally, in order to control the respective apparatuses of an AV system, communication lines match them one to one so that apparatus control commands are transmitted. However, this method complicates the communication lines.

For this problem, a common communication line is used. Recently, a common serial communication method has been increasingly used in order to reduce the respective apparatuses' communication loads. A conventional communication controller will be discussed below with reference to FIGS. 1 and 2.

FIG. 1 shows a conceptional diagram of a conventional communication controller in which an audio component system is taken as a central apparatus to which other apparatuses are coupled. As shown in this drawing, a plurality of input and output ports Rx and Tx are provided in audio component system 1. They are connected to output and input ports Tx and Rx of other apparatuses, i.e., TV receiver 2, VCR 3 and CDP 4.

FIG. 2 is a block diagram of the conventional communication controller. In this drawing, buffers $BF_1$ and $BF_2$ are coupled in series to input and output ports Rx and Tx of audio component system 1, TV receiver 2, VCR 3 and CDP 4. The buffers form a drive portion 5 which is connected to a communication line 6.

The conventional communication controller constructed as above transmits the whole data through the junction of audio component system 1. For instance, in case that data is sent to VCR 3 from TV receiver 2, TV receiver 2 transmits data to audio component system 1, which then transmits the data received from TV receiver 2 to VCR 3.

However, the conventional communication controller couples apparatuses to input and output ports Rx and Tx of central apparatus 1 so that the number of apparatuses forming an AV system is limited to the number of the input and output ports of the central apparatus. In order to increase the number of apparatuses, the number of input and output ports must be increased. This makes their expansion very difficult and complicates line connection. In addition, their data transmission speeds become slow because data must be always sent via the central apparatus.

SUMMARY OF THE INVENTION

Therefore, it is an object of the present invention to provide a nonsynchronous communication controller for an AV system in which a common communication line is given to a plurality of apparatuses forming the AV system or HA system to serially connect them, the respective apparatuses compare data output from themselves and data transmitted via the communication line, if the communication line data is the same as their own data, the apparatuses determine that the communication line data is their own data and thus do not receive the communication line data, if the communication line data is not the same as their own data, the apparatuses determine that other apparatus transmits the data, receive it and do not output data, thereby allowing the number of the apparatuses forming the AV system to be simply expanded and to directly transmit data between the apparatuses without the junction of the central apparatus.

To accomplish the object of the present invention, there is provided a nonsynchronous communication controller for an AV system or HA system for implementing a carrier sense multi-access/collision detection of serial communication mode, the controller comprising: a first collision detector for comparing and mixing a main apparatus' control signal and other apparatus' control signal to detect a first collision signal and a noise of an impulse component; a noise removing portion for removing the impulse noise of the first collision detector to detect only the first collision signal; a ½ window signal generator for receiving the first collision signal of the noise removing portion to produce a ½ Tm window signal; a delay compensator for receiving the first collision signal of the first collision detector to compensate for time base delay; a first collision compensator for comparing and mixing a compensation signal of the delay compensator and the ½ m window signal of the ½ window compensator to output a first collision compensated signal; a second collision detector for comparing and mixing the first compensated signal of the first collision compensator and the ½ Tm window signal of the ½ window signal generator to output a second collision compensated signal; a window signal generator for changing the second collision signal of the second collision detector to a window signal, and interrupting data transmission to a microcomputer; a transmission determining portion for comparing and mixing the window signal of the window signal generator and the main apparatus' control signal to produce transmission or no signal; and a transmission/reception portion for transmitting a signal produced from the transmission determining portion, receiving other apparatus' control signal or the main apparatus' control signal, and transmitting the control signal to the microcomputer and to the first collision detector.

BRIEF DESCRIPTION OF THE ATTACHED DRAWINGS

FIG. 3 is a conceptual diagram of a common serial communication controller of the present invention;

FIGS. 8A–8J are timing diagrams of the nonsynchronous communication controller of the present invention in case of no collision during data transmission between apparatuses A and B;

FIGS. 9A–9K are timing diagrams of the nonsynchronous communication controller of the present invention in case of collision during data transmission between apparatuses A and B.

DETAILED DESCRIPTION OF THE INVENTION

Hereinafter, a preferred embodiment of the present invention will be described with reference to the attached drawings.

Referring to FIG. 3, a common serial communication controller of the present invention comprises a TV receiver 11, VCR 12, CDP 13 and audio component system 14. They each have a pair of communication port 11A, 12A, 13A or 14A. A common communication line is coupled to these communication ports so that TV receiver 11, VCR 12, CDP 13 and audio component system 14 exchange data.

Figure 1:
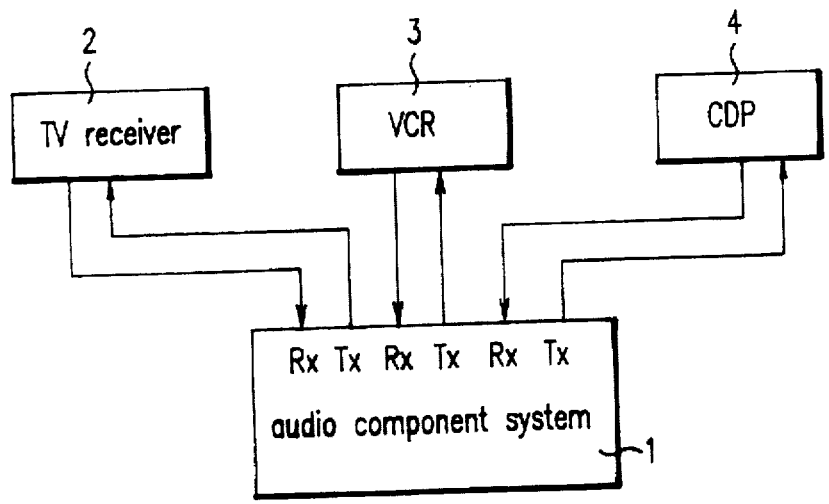
FIG. 1 is a conceptual diagram of a conventional communication controller.
Figure 2:
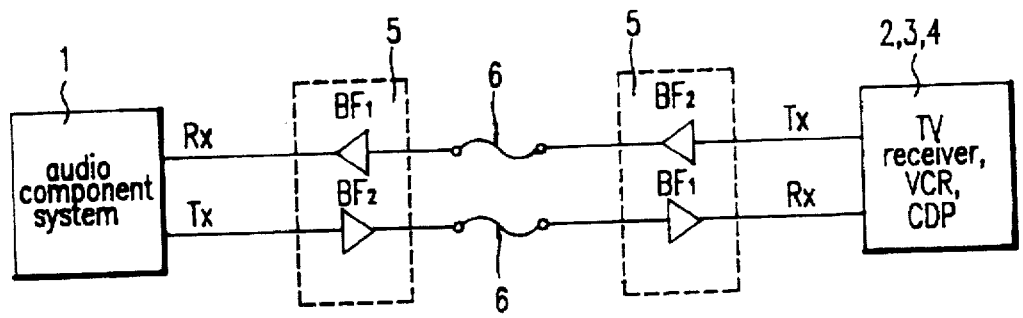
FIG. 2 is a block diagram of the conventional communication controller.
Figure 4:
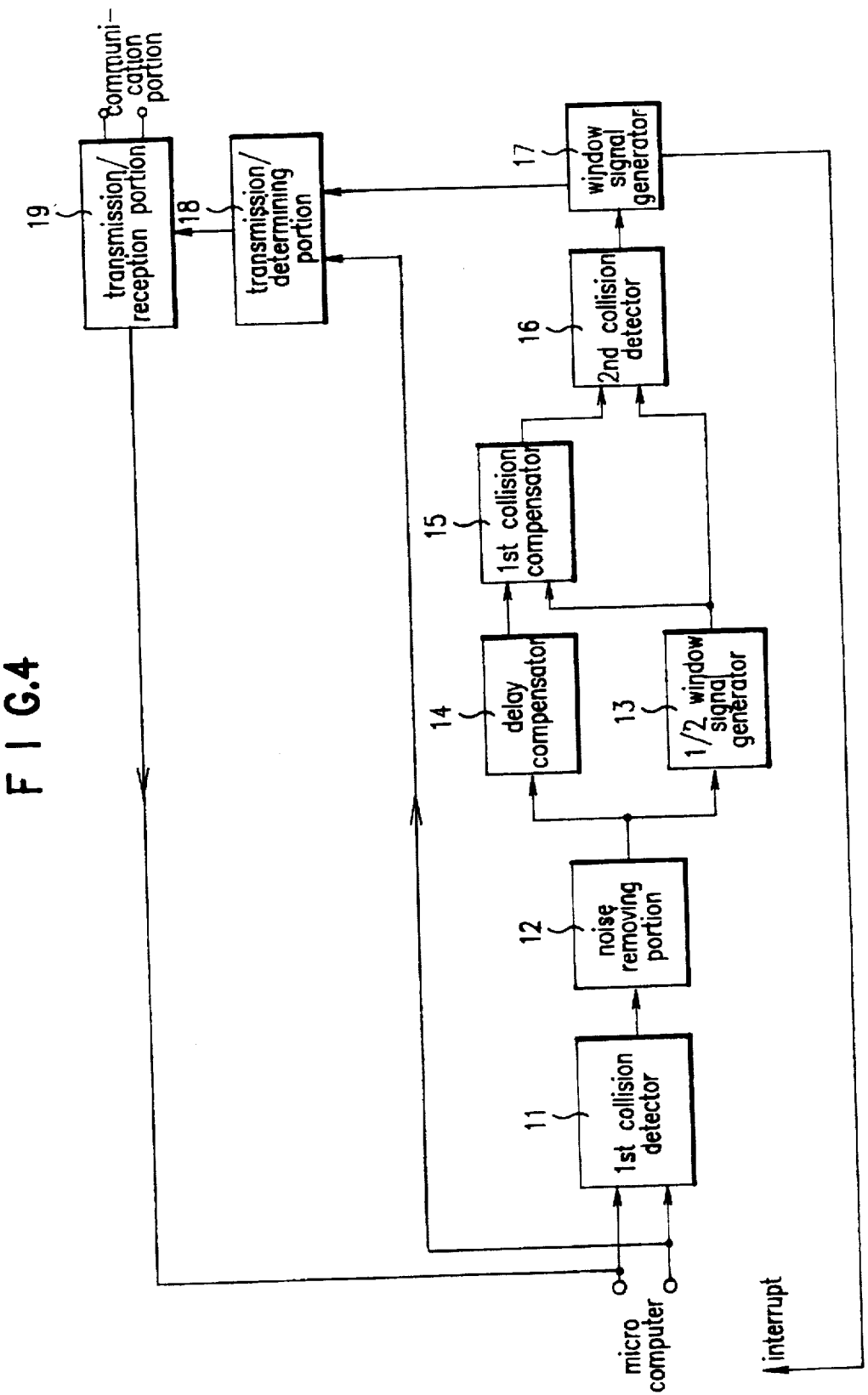
FIG. 4 is a block diagram of a nonsynchronous communication controller for an AV system of the present invention.
Figure 5:
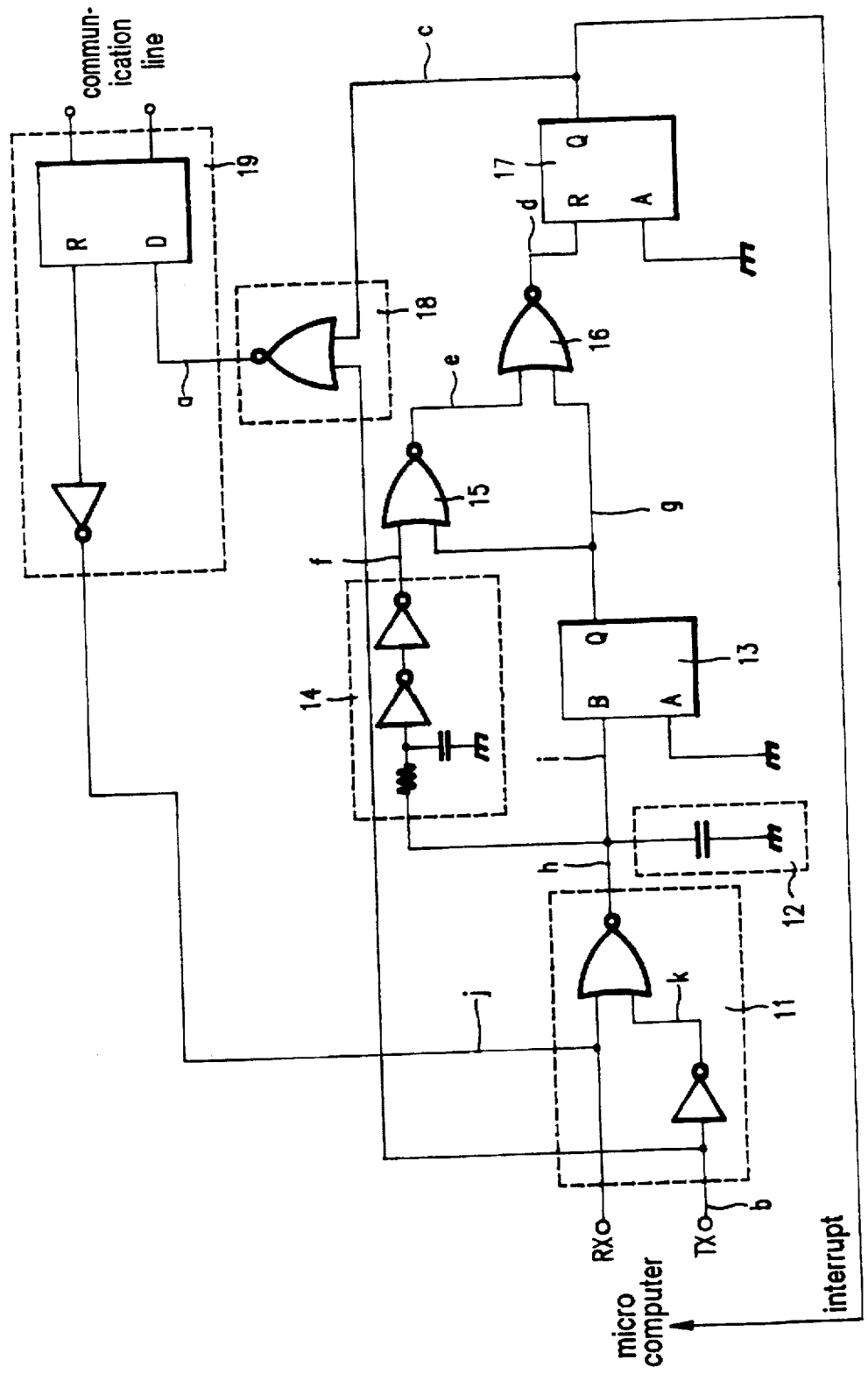
FIG. 5 is a detailed circuit diagram of the nonsynchronous communication controller for an AV system of the present invention.

With such a basic concept, the nonsynchronous communication controller for an AV system of the present invention is, as shown in FIGS. 4 and 5, constructed to comprise a first collision detector 11 formed with an inverter and NOR gate for comparing received data from other apparatus with transmission data of a main apparatus through a NOR operation to detect the glitch noised of a first collision signal and physical impulse component, a noise removing portion 12 formed with a condenser for removing the glitch of a physically produced impulse component of the first collision signal detected from first collision detector 11, a ½ window signal generator 13 for outputting a ½ window signal by a pulse of the first collision signal from which the glitch is removed in noise removing portion 12, a delay compensator 14 having one resistor and two inverters for compensating for the time base delay of the first collision signal of first collision detector 11, a first collision compensator 15 for mixing the time-base delay compensated first collision signal of delay compensator 14 and the ½ window signal of ½ window signal generator 13 through a NOR operation, to thereby compensate for the first collision signal, a second collision compensator 16 for mixing the compensated first collision signal of first collision compensator 15 and the ½ window signal of ½ window signal generator 13 through a NOR operation, to thereby detect a second collision signal, a window signal generator 17 for outputting a window signal by the pulse of the second collision signal produced from second collision detector 16 and feeding it back to a microcomputer of the main apparatus, a transmission determining portion 18 for mixing the window signal of window signal generator 17 and the transmission data of the main apparatus through a NOR operation to thereby output none or the transmission data, and a transmission/reception portion 19 for amplifying the output signal of transmission determining portion 18 to transmit it via a communication line, and feeding back the received data from other apparatus or the transmission data of the main apparatus to the microcomputer and to first collision detector 11.

Figure 6A:
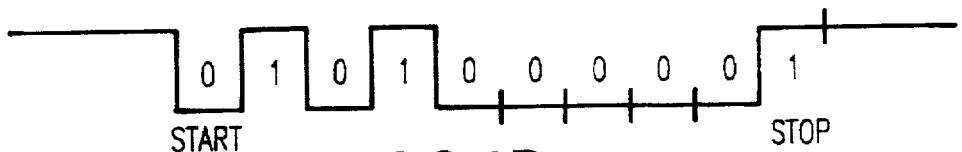
FIGS. 6A–6J are timing diagrams of data transmission of apparatus A in the nonsynchronous communication controller of the present invention.
Figure 6B:
Figure 6C:
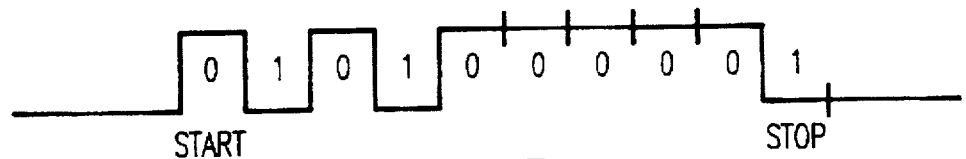
Figure 6D:
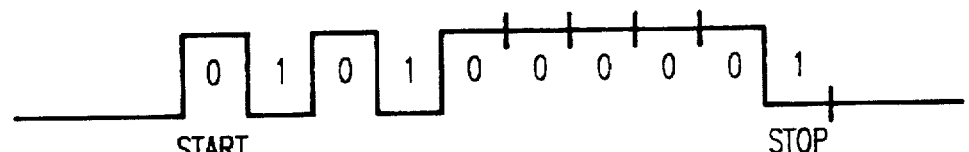
Figure 6E:
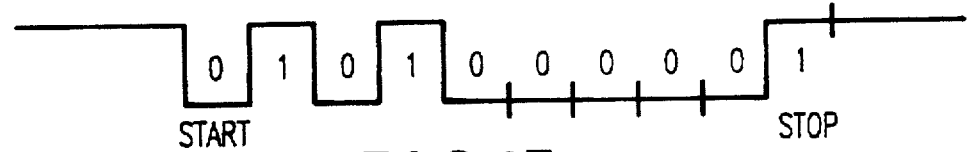
Figure 6F:
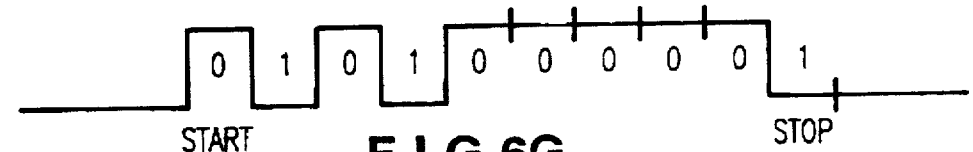

For the operation of the present invention, as shown in FIGS. 6 and 7, in case that apparatus A forming an AV system transmits a control signal φ5h, its microcomputer inputs the microcomputer's TX waveform data φ5h shown in FIG. 6A to transmission determining portion 18, and a signal, whose waveform is inverted from that of FIG. 6A to that of FIG. 6F, to first collision detector 11. According to the data input to transmission determining portion 18 and a LOW signal (see FIG. 6B), the output waveform produced from window signal generator 17, transmission determining portion 18 inverts data φ5h as shown in FIG. 6C through a NOR operation and outputs it to transmission/reception portion 19.

Here, window signal generator 17 transmits the LOW signal (of FIG. 6B), the output waveform, to transmission determining portion 18 and simultaneously feeds it back to the microcomputer. This microcomputer recognizes that there is no collision between data, and continuously outputs the microcomputer's TX waveform data φ5h to transmission determining portion 18.

Because there is no data received from other apparatus, transmission/reception portion 19 does not feed it back but inverts the data signal of FIG. 6C as shown in FIG. 6E while transmitting the waveform of FIG. 6C as the transmission data shown in FIG. 6D. The inverted signal is fed back to first collision detector 11 and to the microcomputer. The transmission data of FIG. 6D is a waveform transmitted as the output waveform of transmission determining portion 18 shown in FIG. 6C without change.

Figure 6G:

When data inverted as shown in FIG. 6F from TX waveform data φ5h produced from the microcomputer and data fed back to first collision detector 11 are compared through a NOR operation, a waveform having only the glitch of the physical impulse component is produced as shown in FIG. 6G and then input to noise removing portion 12, and data in which the first collision signal is not generated is output. Here, the glitch is noise of impulse component physically produced at an inversion position of two signals when data A is changed from LOW to HIGH and data B from HIGH to LOW to mix them logically.

Figure 6H:

In noise removing portion 12, glitch is removed from data of FIG. 6G indicative only of the glitch as shown in FIG. 6H. The signal free of glitch is output to ½ window signal generator 13, delay compensator 14 and first collision compensator 15. Because the data produced from noise removing portion 12 has no glitch as shown in FIG. 6H, ½ window signal generator 13, delay compensator 14 and first collision compensator 15 have no signal as shown in FIG. 6H accordingly.

Figure 6I:
Figure 6J:
Figure 7A:
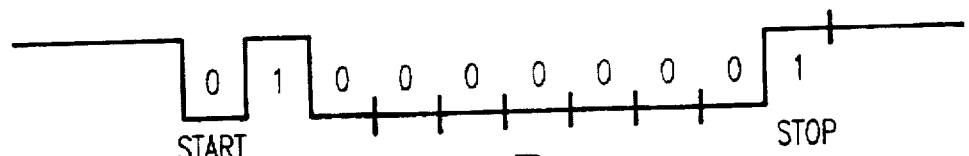
FIGS. 7A–7J are timing diagrams of data transmission of apparatus B in the nonsynchronous communication controller of the present invention.
Figure 7B:
Figure 7C:
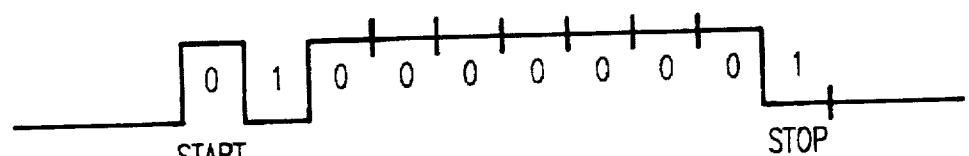
Figure 7D:
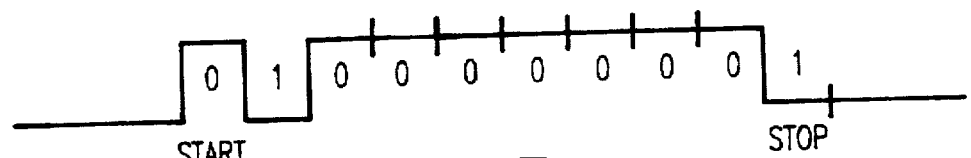
Figure 7E:
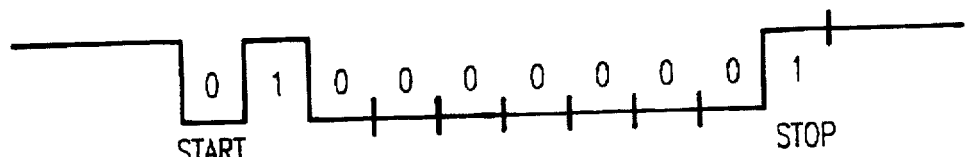
Figure 7F:
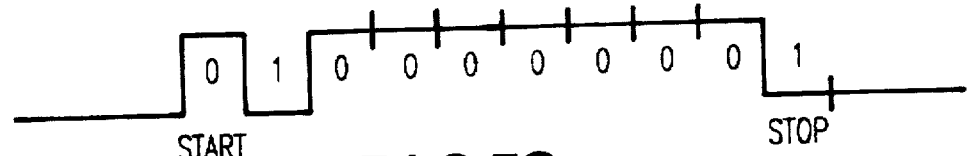
Figure 7G:
Figure 7H:
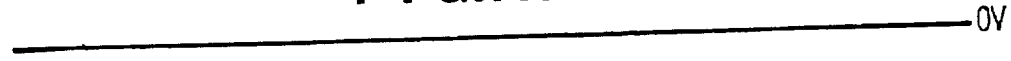
Figure 7I:
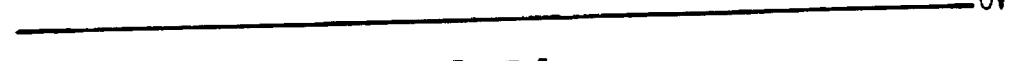
Figure 7J:
Figure 10:
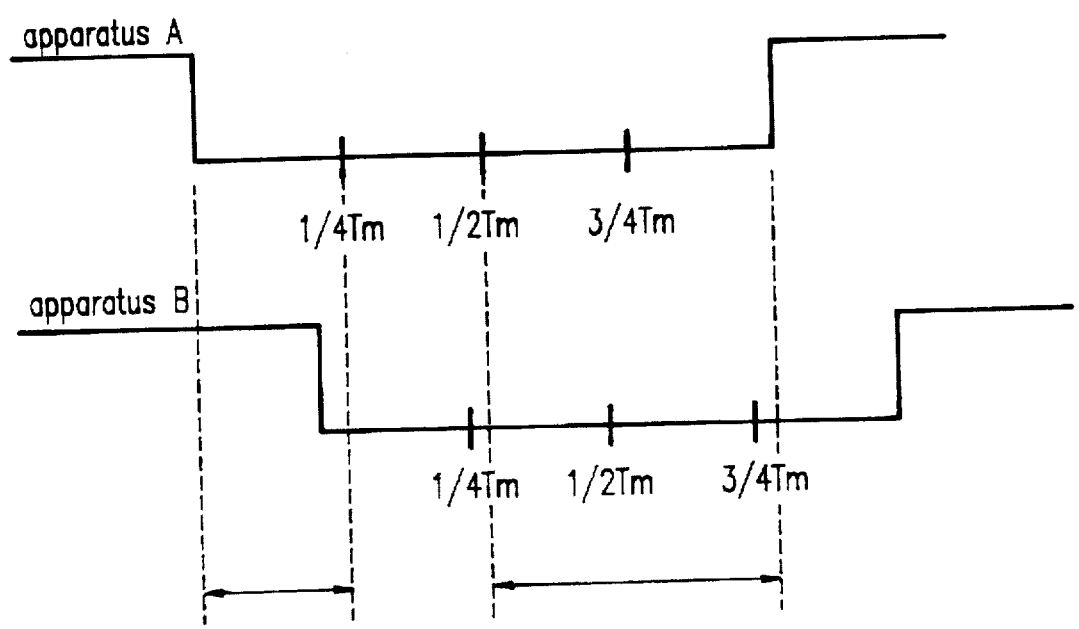
FIG. 10 is a timing diagram of time difference appearing due to the apparatuses' characteristics in the conventional nonsynchronous communication controller.

No-signal data produced from ½ window signal generator 13 and data produced from first collision compensator 15 are received from second collision detector 16 and mixed through a NOR operation. By doing so, a LOW second collision signal, that is, no-signal data, is detected as shown in FIG. 6I, which is converted into no-signal data shown in FIG. 6J by window signal generator 17, then input to transmission determining portion 18 and fed back to the microcomputer.

The microcomputer re-recognizes that there is no collision by the fed-back no-signal data, and continuously transmits data φ5h to transmission determining portion 18. Therefore, transmission determining portion 18 transmits data φ5h to transmission/reception portion 19 in order to stay to occupy the common communication line. For other apparatus B, the above process is performed in the same manner.

In case of transmitting φ1h as shown in FIG. 7, waveforms appearing at the respective portions are the same as above.

Referring to FIGS. 8 and 9, in case that two apparatuses of the AV system transmit their control signals at the same time, when data of apparatus A is transmitted while data (control signal) of apparatus B is received through transmission/reception portion 19 due to a slight time error in accordance with the two apparatuses' characteristics, transmission/reception portion 19 outputs the control signal of the waveform transmitted from apparatus B as shown in FIG. 8I to apparatus A's microcomputer and to first collision detector 11 at the same time. Immediately, the microcomputer's TX waveform data (system control signal) of apparatus A shown in FIG. 7B and data shown in FIG. 8J and inverted from the waveform of apparatus B are input to first collision detector 11.

Received control signal I of apparatus B and transmitted control signal J of apparatus A are mixed through a NOR operation in first collision detector 11 to be output to noise removing portion 12 as the first collision signal within ¼ Tm as shown in FIG. 8H. Here, due to apparatuses' time difference, there is always produced a collision signal within ¼ Tm and no glitch of physical impulse component.

First collision signal H passes through noise removing portion 12 and is changed into a ½ Tm-window signal shown in FIG. 8G by ½ window signal generator 13. In delay compensator 14, the signal appears as a delay compensation signal of 450–550 ns as shown in FIG. 8F in order to compensate for delay time k of 250–350 ns appearing between first collision signal H and ½ Tm window signal. Sequentially, first collision compensator 15 receives the ½ Tm window signal (of FIG. 8G) and the delay compensation signal (of FIG. 8F) to compensate for the ½ window signal (of FIG. 8G) through a NOR operation. As a result, the first collision compensated signal is output as shown in FIG. 8E.

The first collision signal (of FIG. 8E) and ½ Tm window signal (of FIG. 8G) are input to second collision detector 16, which detects LOW second collision signal shown in FIG. 8D through a NOR operation. This second collision signal (of FIG. 8D) is changed to no-signal data (LOW signal) shown in FIG. 8C by window signal generator 17, input to transmission determining portion 18, and then fed back to the microcomputer.

The microcomputer recognizes by the fed-back no-signal data that there is no collision in data transmission, and continuously transmits system control data to transmission determining portion 18. Transmission determining portion 18 NOR-operates the main apparatus' data shown in FIG. 8B and no signal of FIG. 8C produced from window signal generator 17 in order to input a control signal of FIG. 8A to transmission/reception portion 19. Then, transmission is performed in such a manner that the microcomputer's TX waveform occupies the common communication line.

In case that apparatus B's system control signal dominates the communication line, the system control signal of the TX waveform of apparatus B's microcomputer shown in FIG. 9J and occupying the transmission line is input to apparatus A's microcomputer RX via transmission/reception portion 19 and to first collision detector 11. Then, data of FIG. 9K inverted from the system control signal of apparatus A's microcomputer of FIG. 9B is input to first collision detector 11.

First collision detector 11 NOR-operates apparatus B's control signal J and apparatus A's data K to produce the first collision signal shown in FIG. 9H and the glitch of physical impulse component. This glitch is removed in noise removing portion 12. As a result, a first collision signal of FIG. 9I is output.

First collision signal I is changed into a ½ Tm-window signal shown in FIG. 9G by ½ Tm window signal generator 13. In delay compensator 14, the signal appears as a delay compensation signal of 450–550 ns as shown in FIG. 9F in order to compensate for delay time k of 250–350 ns appearing between first collision signal I and ½ Tm window signal.

Sequentially, first collision compensator 15 receives the ½ Tm window signal (of FIG. 9G) and the delay compensation signal (of FIG. 9F) to compensate for the ½ window signal (of FIG. 9G) through a NOR operation. As a result, the first collision compensated signal is output as shown in FIG. 8E.

The first collision signal (of FIG. 9E) and ½ Tm window signal (of FIG. 9G) are input to second collision detector 16, which detects a second collision signal shown in FIG. 9D through a NOR operation. This second collision signal (of FIG. 9D) is changed to a window signal shown in FIG. 9C by window signal generator 17 at a point where the second collision signal is produced, input to transmission determining portion 18, and then fed back to the microcomputer.

The microcomputer recognizes by the fed-back window signal that there is a collision in data transmission, and interrupts transmission of system control data to transmission determining portion 18. If the data is continuously transmitted due to the microcomputer's false operation, transmission determining portion 18 NOR-operates the main apparatus' data shown in FIG. 9B and the window signal of FIG. 9C produced from window signal generator 17 in order to input a control signal of FIG. 9A to transmission/reception portion 19. Then, the transmission determining portion does not transmit TX waveform data produced the main apparatus' microcomputer from the next step.

As described above, the nonsynchronous communication controller for an AV system of the present invention prevents the AV system in which an apparatus' data always occupies a communication line from false operation due to a time difference below ¼ Tm appearing at the respective apparatuses. Further, the present invention greatly increases the transmission speed of data, simply expands a plurality of other apparatuses, and facilitates connection of communication line.

What is claimed is:

1. A nonsynchronous communication controller for an AV system or HA system for implementing a carrier sense multi-access/collision detection of serial communication mode, said controller comprising:

a first collision detector for comparing a main apparatus' control signal and other apparatus' control signal to detect a first collision and generate a first collision signal and a noise of an impulse component;

a noise removing portion for removing the impulse noise of said first collision detector to detect only the first collision signal;

a ½ window signal generator for receiving the first collision signal of said noise removing portion to produce a ½ Tm window signal;

a delay compensator for receiving the first collision signal of said first collision detector to compensate for time base delay;

a first collision compensator for comparing a compensation signal of said delay compensator and the ½ Tm window signal of said ½ window signal generator to output a first collision compensated signal;

a second collision detector for comparing the first compensated signal of said first collision compensator and the ½ Tm window signal of said ½ window signal generator to output a second collision detector signal;

a window signal generator for changing the second collision signal of said second collision detector to a window signal, and interrupting data transmission to a microcomputer;

a transmission determining portion for comparing the window signal of said window signal generator and the main apparatus' control signal to produce transmission or no signal; and a transmission/reception portion for transmitting a signal produced from said transmission determining portion, receiving other apparatus' control signal or the main apparatus' control signal, and transmitting the control signal to the microcomputer and to said first collision detector.

2. A nonsynchronous communication controller for an AV system as claimed in claim 1, wherein said first collision detector is formed with an inverter and NOR gate.

3. A nonsynchronous communication controller for an AV system as claimed in claim 1, wherein said first collision compensator, second collision detector, and transmission determining portion each are formed with a NOR gate.

4. A nonsynchronous communication controller for an AV system as claimed in claim 1, wherein said noise removing portion is formed with a condenser.

5. A nonsynchronous communication controller for an AV system comprising:

a collision detector for detecting a collision and generate a first collision signal by comparing a data received from a system with a transmission data of the AV system;

a delay compensator for compensating for a time delay of the collision signal detected by the collision detector;

a window signal generator for outputting a window signal which prevents a transmission control signal from being transmitted by the collision signal whose time delay is compensated for by the delay compensator;

a transmission determining portion for determining whether or not a transmission data is output by comparing a transmission data from the AV system with the window signal from the window signal generator; and a transmission and reception portion for amplifying and transmitting the output signal from the transmission determining portion, and receiving a control signal from the system or a control signal of the AV system to be transmitted to a microprocessor and at the same time to the collision detector.

* * * * *